Figure 1:
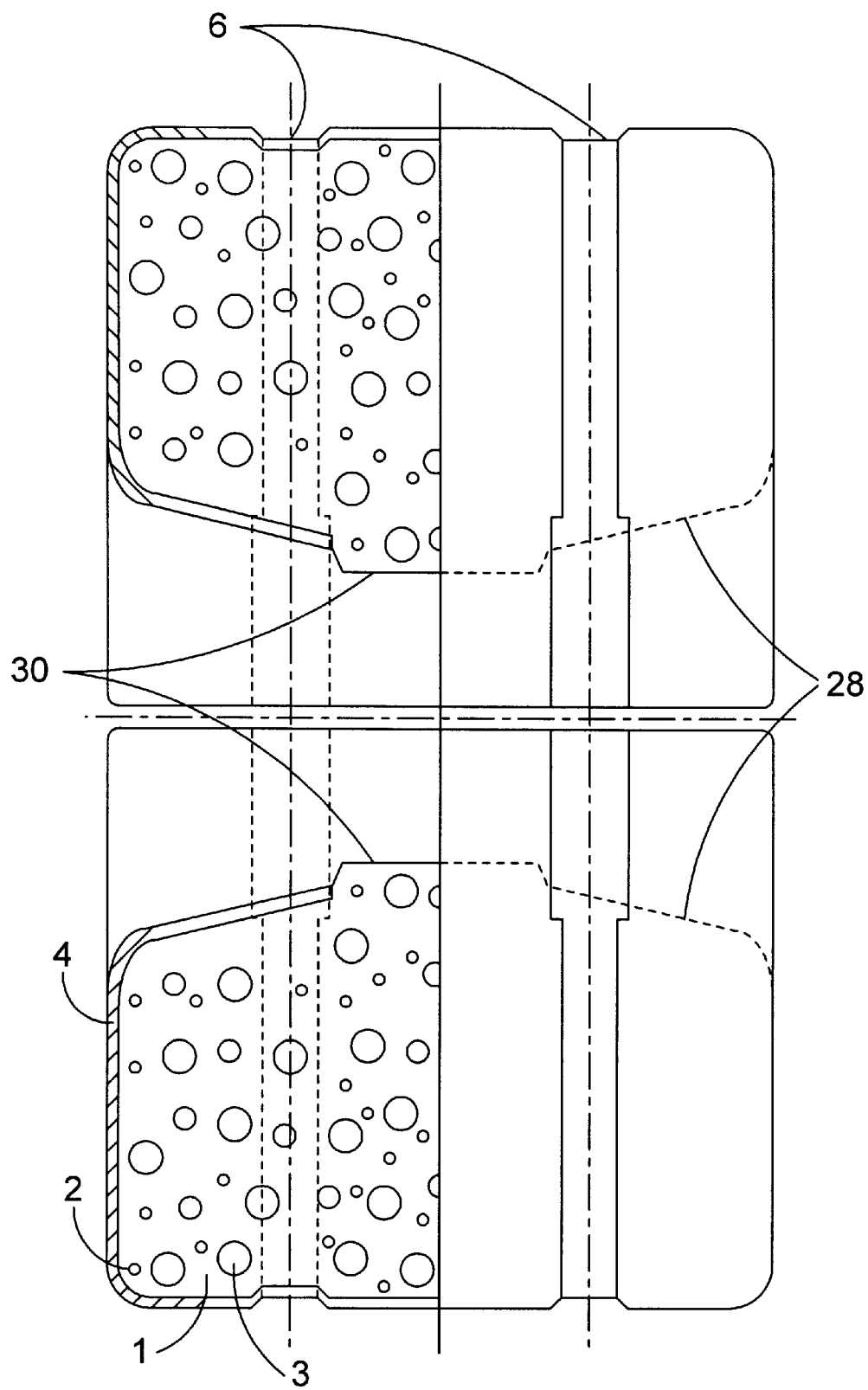

United States Patent [19]

Oram

[11] Patent Number: 5,973,031

[45] Date of Patent: Oct. 26, 1999

[54] BUOYANCY MATERIAL

[75] Inventor: Robert K Oram, Aberdeen, United Kingdom

[73] Assignee: Balmoral Group Ltd, Aberdeen, United Kingdom

[21] Appl. No.: 08/874,399

[22] Filed: Jun. 13, 1997

[30] Foreign Application Priority Data

Jun. 14, 1996 [GB] United Kingdom .................... 9612434
Jul. 24, 1996 [GB] United Kingdom .................... 9615552

[51] Int. Cl.$^6$ ....................................................... C08J 9/32
[52] U.S. Cl. ........................... 523/218; 523/219; 523/485
[58] Field of Search .................................... 523/218, 219; 524/485

[56] References Cited

U.S. PATENT DOCUMENTS 3,711,581 1/1973 Fowler, Jr. et al. ...................... 264/45
4,025,686 5/1977 Zion ........................................ 428/310
5,508,315 4/1996 Mushović ............................... 521/122

FOREIGN PATENT DOCUMENTS 2286649 8/1995 United Kingdom .

Primary Examiner—Edward J. Cain
Attorney, Agent, or Firm—Conley, Rose & Tayon PC

[57] ABSTRACT

A buoyancy material comprising:

i. a matrix obtainable by reacting a dispersion of polyester precursor in water with a catalyst; and ii. at least one density reducing agent selected from the group consisting of gas bubbles, microspheres and macrospheres dispersed in the matrix.

21 Claims, 1 Drawing Sheet

BUOYANCY MATERIAL

This invention generally relates to a buoyancy material especially for use in the sub-sea transport and recovery of hydrocarbons.

It is known to provide buoyancy material of foam material for example for use in risers. In shallow water low density materials such as polyurethane foam is used. This material is generally not capable of withstanding the high pressures involved with deep water. Common sub-surface buoyancy comprises an epoxy resin matrix material provided with hollow glass microspheres. The grade of microspheres is selected to suit the service conditions especially pressure due to depth. Under some circumstances it may be possible to include polymer macrospheres of 10 mm or more O.D. The primary advantages of using macrospheres are that they are cheaper than microspheres and have lower density (and hence higher buoyancy) than microspheres.

An elastomer PE, PU or GRP skin to act as a water barrier and to give mechanical protection is generally provided.

In accordance with an embodiment there is provided a buoyancy material in which the matrix material comprises a water-extended polyester resin.

In accordance with an embodiment there is provided the use of water extended polyester in buoyancy material.

Description will be provided by way of non-limiting example by reference to the accompanying figure which is a partial section of riser buoyancy.

Those skilled in the art will have little difficulty in devising suitable polyester precursors. Suitable materials include the reaction product of polyols especially diols and polyol precursors such as epoxides, with organic acids or anhydrides, together with unsaturated acids or anhydrides and an unsaturated monomer. These materials are reacted with a catalyst such as paratolene sulfonic acid, tetrabutyl titanite, and hydrated monobutyl tin oxide to give a precursor. The precursor is crosslinked in known way with a catalyst especially a free radical catalyst.

By way of non-limiting example the polyol or polyol precursor may be one or more of propylene glycol, diethylene glycol, ethylene glycol, neopentyl glycol, dipropylene glycol, dibromoneopentyl glycol, bisphenol A diglycidyl ether, bisphenol A dipropoxy ether, tetrabromobisphenol A diethoxyether propylene oxide and 1,4 butane diol.

Representative (but non-limiting) acid and anhydrides which may be used alone or in mixture include phthalic anhydride, the reaction product of dicyclopentadiene and maleic anhydride, isophthalic anhydride, adipic anhydride, chlorendic anhydride (CAS No. 115-27-5), tetrabromophthalic anhydride, tetrahydrophthalic anhydride, terephthalic acid and tetrachlorophthalic anhydride.

Exemplary unsaturated acid and anhydrides include maleic anhydride, fumaric acid, methacrylic acid, acrylic acid and itaconic acid. These can also be used alone or in mixture.

Typical unsaturated monomers include styrene, vinyl toluene, methyl methacrylate, diallyl phthlate, α-methylstyrene; triallyl cyanurate, divinyl benzene and mixtures thereof.

The cross-linking reaction to give the polymer is typically a free radical catalyst for example benzoyl peroxide, methyl ethyl ketone peroxide, cumene hydroperoxide, lauroyl peroxide, t-butyl peroctoate and t-butyl perbenzoate.

The polyester may comprise conventional polyester casting resin.

For example water and resin monomer are added to a mixing vessel containing a slow speed agitator and agitated until the mixture becomes homogenous. If desired up to about 5% of the total quantity of microspheres to be added can be added at that time and this may facilitate emulsion development. Other materials may be added to aid the formation and stabilization of the water and polyester resin emulsion.

The remainder of the microspheres are then added portion wise to the stirred emulsion.

If desired the mixture may be heated for example to about 25° C. to facilitate mixing and the subsequent polymerization.

The mixture can then be transferred or example by continuously pumping to a mould optionally containing macrospheres and via a mixing element where the cure catalyst is added and distributed.

The precise amount of water added is not crucial to the performance of the buoyancy material but will typically range from 10 to 80% by weight of the final mixture. Greater quantities of water give rise to cheaper products with lesser mechanical performance than smaller quantities of water.

Typically glass microspheres will be used. Those skilled will have little difficulty in selecting suitable microspheres which may have a particle size of 5 to 500 microns especially about 200 μm. Typically the microspheres make up 10 to 65% of the volume of the final mixture.

To reduce the bulk-density even further macrospheres for example hollow plastic balls of diameter greater than 5 or 10 mm may be employed. Up to 80% by volume of the mixture may conveniently be employed.

Air in the form of small bubbles typically up to 10% by volume of the mixture may be incorporated to further reduce the density and cost of the buoyancy material.

A typical material rated for long term use at 150 meters might comprise:

|  | Vol. % |
| --- | --- |
| Polyester resin | 17.4 |
| Hollow glass microspheres | 48.5 |
| Water | 30.1 |
| Entrained air | 3.9 |
| Polymerisation catalyst | 0.1 |

Using microspheres of true density 200 kg/m$^3$ gives rise to a syntactic material of density 600 kg/m$^3$ which can be further reduced by addition of macrospheres.

The buoyancy material described herein has several advantages:

The system is relatively cheap.

Polyester resin costs about the same as epoxy resin but the overall cost can be substantially reduced in view of the water dilution.

The water in the system with its high heat capacity acts as a heat sink and moderates the polymerization exotherm and thus the rate of polymerization. This leads to many advantages including slower reaction kinetic and therefore less time-critical processing of the catalyzed mixture, the ability to clean mixing and handling equipment before polymerization has progressed significantly, reduced thermal expansion and contraction allow the moulds to be of lighter construction and also reduce the potential for thermal cycling cracking of the moulding and lessen the chance of thermal damage to the polymer macrospheres. Additionally the moulding will be essentially non-flammable if the water content is high enough.

FIG. 1 shows an element of riser buoyancy suitable for example for clamping to a riser by a clamp as described in GB 2 286 649 the disclosure of which is incorporated by reference. The buoyancy comprises a water extended polyester core 1 provided with microspheres 2 and macrospheres 3. An outer skin 4 of polyurethane is applied for example by spraying to the core 1. In the illustrated embodiment grooves 6 are provided for clamping the buoyancy element to the riser so that surface 30 engage the riser. Tapered portions 28 allow some movement of the flexible riser.

I claim:

1. A buoyancy material comprising:
   i. a matrix obtained by reacting an emulsion of polyester precursor in water with a catalyst, wherein the matrix comprises a water-extended polyester resin; and
   ii. at least one density reducing agent comprising microspheres, macrospheres, or combinations thereof dispersed in the matrix.

2. The buoyancy material of claim 1 wherein the polyester precursor comprises the reaction product of a polyol, an unsaturated acid or an unsaturated acid anhydride, and an unsaturated monomer.

3. The buoyancy material of claim 1 wherein the density reducing agent comprises at least 10% by volume of the total volume of the buoyancy material.

4. The buoyancy material of claim 1, further comprising a water impervious polymer skin.

5. The buoyancy material of claim 4 wherein the polymer skin comprises polyethylene, polyurethane, or glass fibre reinforced polymer.

6. A method for making a buoyancy material comprising:
   i. dispersing a polyester resin precursor in water to form an emulsion;
   ii. dispersing at least one density reducing agent comprising microspheres, macrospheres, or combinations thereof in the emulsion; and
   iii. curing the resin precursor to form a matrix with the density reducing agent dispersed therein, wherein the matrix comprises a water-extended polyester resin.

7. The method of claim 6, further comprising forming a water impervious coating of polymer on the buoyancy material.

8. A method of using a buoyancy element, comprising providing a buoyancy material that comprises water extended polyester resin.

9. A buoyancy material comprising:
   a matrix obtained by reacting an emulsion of polyester precursor in water with a catalyst, wherein the matrix comprises a water-extended polyester resin; and
   at least one density reducing agent.

10. The buoyancy material of claim 9, wherein the at least one density reducing agent comprises microspheres.

11. The buoyancy material of claim 9, wherein the at least one density reducing agent comprises macrospheres.

12. The buoyancy material of claim 9, further comprising a water impervious polymer skin, and wherein the polymer skin comprises polyethylene.

13. The buoyancy material of claim 9, further comprising a water impervious polymer skin, and wherein the polymer skin comprises polyurethane.

14. The buoyancy material of claim 9, further comprising a water impervious polymer skin, and wherein the polymer skin comprises glass fibre reinforced polymer.

15. The buoyancy material of claim 9, wherein the water is 10 to 80 percent by weight of the buoyancy material.

16. A method for making a buoyancy material, comprising:
   i. dispersing a polyester resin precursor in water to form an emulsion;
   ii. dispersing at least one density reducing agent in the emulsion; and
   iii. curing the resin precursor to form a matrix with the density reducing agent dispersed therein, wherein the matrix comprises a water-extended polyester resin.

17. The method of claim 16, wherein the at least one density reducing agent comprises microspheres.

18. The method of claim 16, wherein the at least one density reducing agent comprises macrospheres.

19. The method of claim 16, wherein the water in said dispersing a polyester resin precursor is 10–80 percent by weight of the final buoyancy material.

20. The buoyancy material of claim 1, wherein the water is 10–80 percent by weight of the buoyancy material.

21. The method of claim 6, wherein the water in said dispersing a polyester resin precursor is 10–80 percent by weight of the final buoyancy material.

* * * * *